(12) United States Patent
Niesser

(10) Patent No.: US 8,656,217 B2
(45) Date of Patent: Feb. 18, 2014

(54) METHOD FOR ERROR DETECTION DURING EXECUTION OF A REAL-TIME OPERATING SYSTEM

(75) Inventor: Otto Niesser, Allersberg (DE)

(73) Assignee: Siemens Aktiengesellschaft, Munich (DE)

(*) Notice: Subject to any disclaimer, the term of this patent is extended or adjusted under 35 U.S.C. 154(b) by 241 days.

(21) Appl. No.: 13/315,021

(22) Filed: Dec. 8, 2011

(65) Prior Publication Data
US 2012/0151280 A1 Jun. 14, 2012

(30) Foreign Application Priority Data
Dec. 9, 2010 (EP) .................................... 10194309

(51) Int. Cl.
*G06F 11/00* (2006.01)

(52) U.S. Cl.
USPC .......................................................... 714/11

(58) Field of Classification Search
USPC .......................................................... 714/11
See application file for complete search history.

(56) References Cited

U.S. PATENT DOCUMENTS

| | | | |
|---|---|---|---|
| 5,889,988 A * | 3/1999 | Held | 718/103 |
| 6,625,751 B1 | 9/2003 | Starovic et al. | |
| 2003/0126498 A1 | 7/2003 | Bigbee et al. | |
| 2005/0251806 A1* | 11/2005 | Auslander et al. | 718/100 |
| 2010/0058335 A1 | 3/2010 | Weber | |
| 2013/0125117 A1* | 5/2013 | Niesser et al. | 718/1 |
| 2013/0125118 A1* | 5/2013 | Niesser et al. | 718/1 |

* cited by examiner

*Primary Examiner* — Bryce Bonzo
(74) *Attorney, Agent, or Firm* — Cozen O'Connor

(57) ABSTRACT

A method for error detection during execution of a real-time operating system, wherein logically-identical instances of the real-time operating system are executed in parallel on a plurality of processor cores of a first processor in a shared virtualization environment. The hypervisor supervises the parallel execution of the instances, and during execution of a hardware access initiated by the instances, the data transmitted during the hardware access for each instance of the logically-identical instances is compared with each other by the hypervisor. In the event of a discrepancy between the transmitted data or in the event of a unilateral hardware access initiated by one of the instances, an error is deemed to be detected by the hypervisor.

11 Claims, 4 Drawing Sheets

FIG 1
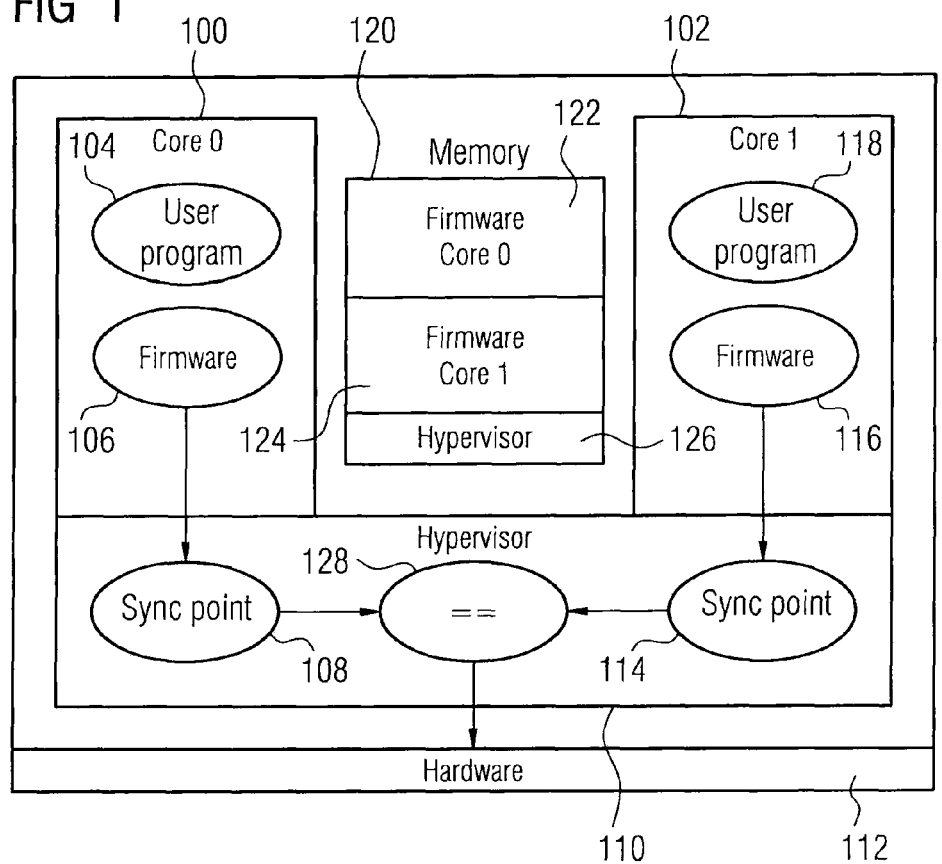
FIG 2
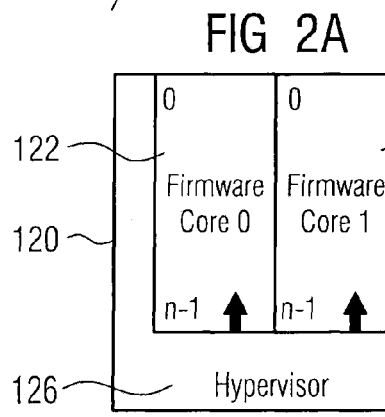
FIG 2A
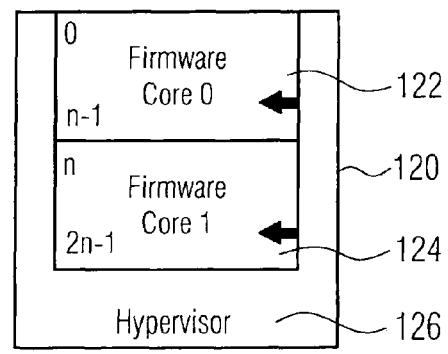
FIG 2B

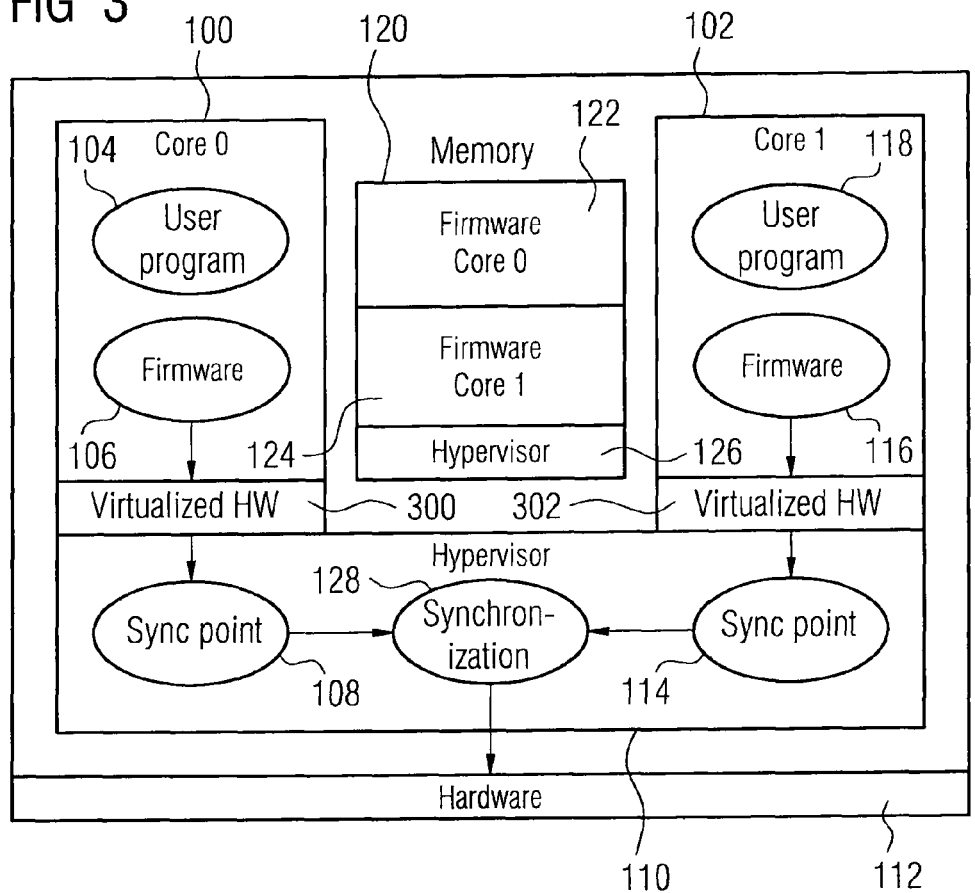
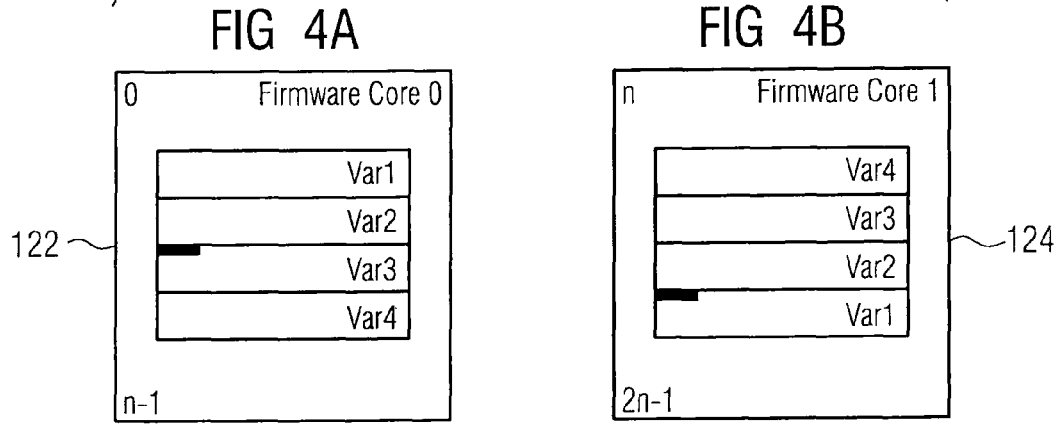

METHOD FOR ERROR DETECTION DURING EXECUTION OF A REAL-TIME OPERATING SYSTEM

BACKGROUND OF THE INVENTION

1. Field of the Invention

The invention relates to fault detection and, more particularly, to a method for error detection during execution of a real-time operating system, a computer program product and a device for error detection during the execution of the real-time operating system.

2. Description of the Related Art

In general, many modern processors offer a number of processor cores and virtualization technologies. In such cases so-called hypervisors are used. Hypervisors involve software which, by using virtualization technologies, run one or more guest operating systems on real hardware and in doing so manage available resources. Here, the resources can be allocated both to the guests and also remain under hypervisor control. In contrast to conventional technologies, this is performed with a lower performance overhead and without the need to intervene in a guest operating system.

The primary aim here is to make optimum use of the available processor power by allocating different tasks to the individual processor cores. Thus, an operating system with real-time capabilities can be entrusted with the control tasks, while on the other core a standard operating system, such as Windows, can be used for the visualization of the processes currently running.

A problem with the execution of real-time operating systems is that these must be secured against incorrect execution. Especially in automation systems, programming errors and also hardware-side errors can lead not only to the automation systems either causing the product to be produced or processed incorrectly, but also to a total failure of the automation system occurring. In all cases, major economic damage is caused, which could be avoided by suitable error detection mechanisms during the execution of a real-time operating system.

SUMMARY OF THE INVENTION

It is therefore an object of the invention to provide a method, computer program product and device that serves to detect errors during execution of a real-time operating system.

This and other objects and advantages are achieved in accordance with the invention by a method for error detection during execution of a real-time operating system, where logically identical instances of the real-time operating system are executed in parallel on at least two processor cores of a first processor in a shared virtualization environment, and a hypervisor monitors the parallel execution of the instances. In accordance with the invention, during execution of a hardware access initiated by the logically identical instances, the data transmitted during the hardware access for each instance of the logically identical is compared with one another by the hypervisor, and in the event of a deviation in the transferred data or in the event of a hardware access initiated unilaterally by one of the instances, an error is deemed to be detected by the hypervisor.

In accordance with the invention, a concept of system security is thus provided in which the hypervisor is used for parallel processing of a wider diversity of versions of a real-time operating system (i.e., firmware) for control tasks. The aim is to detect deviations in the processing on both cores and, for example, to stop control in an assigned automation system before the user can sustain damage from corrupted data.

From the outside looking in, the system properties of a controller do not change for the user with measures presented here for system security. In each case, the influence on performance, i.e., processing speed and system latency times, must be considered on a product-specific basis.

The interaction of the hypervisor will be needed for various actions of the firmware (e.g., access to virtual or real hardware). Here, the processing of the virtual machine is interrupted, and the hypervisor is informed about the cause of the interrupt. It is also possible for a virtualized software to interrupt the virtual machine to cause the hypervisor to help out by processing specific opcodes (hypercall).

Both types of interrupts can be used to synchronize the working or intermediate results of the virtualized firmware instances.

The type of synchronization described during an interrupt will be referred to below as a 'synchronization point'.

This creates a control instance that detects errors in the internal execution of the controller and can react accordingly. Help can be provided for the problem of incorrect execution by undetected memory errors, as discussed below, which was not possible in all cases with the previous conventional solutions.

The minimum necessary synchronization comprises the checking of data that is written to the hardware and the distribution of data that is read from the hardware. Should different data be written, different synchronization points be reached or only one synchronization point be reached unilaterally, it can be assumed that there is a firmware malfunction.

In accordance with an embodiment of the invention the hardware access initiated by one of the instances involves a direct hardware access or a hardware access via a hypercall using paravirtualization.

Basically, the firmware interacts with the hardware, for example, through input and output ports (I/O port), memory maps (memory mapped device), interrupt requests (interrupt) and direct memory access (DMA). All these interactions can and must be balanced and synchronized by the hypervisor.

In such cases, the hardware access can basically be realized by two methods. On the one hand, it is possible to leave the hardware driver in the virtualized firmware and to trap and synchronize the resulting hardware accesses in the hypervisor (hardware virtualization). The other option consists of relocating the lowest levels of the hardware driver into the hypervisor and realizing access thereto via hypercall (paravirtualization).

In the case of hardware virtualization, the hardware access to I/O ports and memory mapped devices can be trapped by the hypervisor and processed. For interaction with the hardware via an interrupt, it should be noted that both virtualized firmware instances may under no circumstances be interrupted at different points. This can be achieved by all interrupts being trapped by the hypervisor and injected at synchronization points into virtualized firmware. Another option is to allow the firmware to run with blocked interrupts and to interrogate the previous interrupt sources on a regular basis for pending events (polling).

Additional requirements on the firmware or hypervisor exist for processing hardware with DMA capabilities. DMA access only occurs at a physical address. Consequently, the hypervisor must detect and process the presence of a DMA transfer to compare or synchronize the memory content. This requirement can be met with little effort by simply inserting synchronization points in DMA-enabled drivers of the virtualized firmware, which makes the presence of DMA tasks recognizable for the hypervisor in a simple manner.

In a paravirtualized solution, as described above, the driver, including the interrupt and DMA processing, is relocated into the hypervisor. The driver is called by a hypercall. After processing is complete, the result is notified to the virtualized firmware instances by injection of an interrupt or by setting a memory cell.

In the decision as to which driver model will be selected, the development outlay should be weighed against performance. If the performance is to be prioritized, then the hardware drivers should be relocated into the hypervisor.

In accordance with an embodiment of the invention, the hardware access comprises a memory access where, during execution of a memory access initiated by the logically identical instances, the logically identical instances access a shared memory.

For example, memory accesses undertaken using identical virtual address spaces for both instances, where the virtual address spaces are assigned to different physical address spaces for each instance of the logically identical instances. Here, the logically identical instances of the firmware can each have the same virtual address space available to them, which is assigned to different physical address spaces. Thus, absolutely identical versions of the firmware can be run or executed.

Alternatively, the memory is accessed using different virtual address spaces for both logically identical instances. Here, the two firmware instances must be in different locations. The different virtual address spaces with the associated physical address spaces can be held identically to simplify the programming of the hypervisor, but this is not a necessary requirement for the disclosed embodiments of the method in accordance with the invention.

Provided the memory of the controller is able to be accessed from all cores, the hypervisor, by appropriate programming of the page tables, can look after suitable memory division and access protection. Although this is not a necessary requirement for realizing the system security, errors by cross accesses between the firmware instances and from the firmware instances into the hypervisor are avoided right from the outset. The hypervisor itself always has access to the memory of its guests, i.e., the firmware instances executing under its control.

The two alternatives, i.e., identical or different virtual address spaces, have individual advantages. Thus, it is basically sufficient for detection of memory corrupted by hardware errors to let identical firmware instances run or execute in parallel. The processing of code and data then occurs at identical virtual addresses, but necessarily at different physical addresses. In any event, a separate memory area per core is needed for the data. For the program code, this is also necessary to enable corrupt program memory to be detected as well as corrupt data memory. The discrepancy in the working results is noticed at the latest on output of corrupt data at a hardware interface or divergence at synchronization points.

Thus, the presently contemplated embodiment that provides memory protection is suitable for detection of hardware errors, such as flipped memory or incorrect accesses by DMA-enabled devices. Previously, errors in the memory could only be detected by the use of ECC-RAM. The advantage compared to the known solutions lies in the possibility of being able to detect the two types of errors even when using standard RAM.

In this presently contemplated configuration, a memory error caused by hardware is able to be identified. Consequently, a software error could still continue to remain unnoticed. For example, this does not make possible the detection of data corruption by reading and writing by incorrect pointers that could be the result of incorrect firmware programming. It is therefore a case of introducing further measures for diversification of the firmware without however introducing unnecessary additional complexity into the firmware.

In order to be able to identify these types of data corruption, the firmware of the two processors is thus stored, for example, within the controller at different virtual addresses. Here, the firmware continues to be identical, with only the address location in relocating it being different. If a memory cell selected at random is now read or written, this leads to misinterpretation or corruption of different logical contents in both processors of the controller. As soon as the corrupt data is processed or the corrupt firmware is executed, the error can be detected.

There has not previously been any satisfactory solution to this problem. Complete security cannot be guaranteed by using previously available methods such as write protection.

In accordance with a further embodiment of the invention, the associated memory areas of the shared memory for the logically identical instances differ for different data types.

As a result, it is possible to detect a data corruption caused by reading and writing beyond memory area boundaries, e.g., resulting from programming error, because a further error source with the use of pointers gives addressing beyond the memory area allowed for this purpose. Here, data in the neighborhood of the actual user data is either misinterpreted or corrupted.

For identification of this type of error, it is thus proposed that the different data areas of data types be constructed on the two cores differently at different levels of abstraction.

At the topmost level of abstraction (link segments), this relates individually to data types, such as initialized global data (e.g. .data), uninitialized global data (e.g. .bss), constant data (e.g. .rodata), local data (stack areas) and program data (e.g. .text).

Starting, for example, from a specific assignment of data to specific memory areas for one of the firmware instances, resorting to the memory areas can occur, e.g., by changing the sequence of individual linker segments, at lower levels of abstraction, e.g., by changing the variable and function sequences in the linker segments or stacks, introducing differently initialized dummy variables and functions of different length in the linker segments or stacks or initializing uninitialized data and empty memory differently.

In addition, the initialization on the different processors is preferably to be varied in the management of memory resources such that areas of different adjacency conditions will be occupied with parallel requests for resources.

Here, a problem is also solved for which there has not been a satisfactory prior technical solution. It is in fact possible to safeguard the adjacency of data through processor mechanisms (e.g., paging). However, in practice, the granularity is so coarse that it is not applicable for individual data structures in practice.

Thus, in accordance with the disclosed embodiments of the method of the invention for memory protection, it is possible to detect the described types of memory error, even where the conventional methods failed or could not be employed for reasons of cost. Even systems that do not use the method in the product version can profit from use of the disclosed embodiments of the method by being used temporarily during the system testing phase to uncover the types of above-described programming errors.

In another embodiment of the invention, at least one further identical instance of the real-time operating system is executed on a second processor, where the error is notified to the second processor in the event of error detection.

This corresponds, for example, to using the above described method for a high-availability controller (H system). A high-availability controller (H-system) consists of two controller modules (H-CPU) that are linked to one another by specific communication modules. The aim is thus, in the event of a failure or a malfunction of one of the H-CPUs, to be able to continue the running the user program executing in this H system on the remaining H-CPU without any impact.

For this purpose, the known user program is run or executed in parallel in both H-CPUs. Here, for example, the firmware must distribute incoming and outgoing data (e.g., periphery data or communication data) for unilateral inclusion in the H system to both H-CPUs, where for duplicated (i.e., redundant) connection it must synchronize the data in a suitable manner.

In this case, the firmware of the two H-CPUs monitors the processing. On failure of an H-CPU, the remaining H-CPU continues the user program. With discrepancies in execution, such as loss of redundancy, the firmware has to ensure that the H-CPU that has created the discrepancies by incorrect processing is removed from the H system. Assigning incorrect behavior to an originator is not a trivial matter. In the case of the firmware of the H-CPU, it is especially rendered more difficult by its high level of complexity.

The proposed methodology in accordance with the disclosed embodiments of the invention for memory protection is advantageous for use in the H system because it makes a secure identification of a faulty H-CPU possible. As soon as one of the H-CPUs notices an error during the execution of its real-time operating system, this is notified to the other H-CPU, which can then completely assume the tasks of the controller. Thus, instead of merely establishing a discrepancy between the work of the two H-CPUs without knowing which CPU is now faulty, in the present case the faulty CPU is detected as such and, for example, decoupled from operation of the assigned automation system.

In accordance with an embodiment of the invention, the error is notified by sending a signal to the second processor or by deactivating a communication link to the second processor.

It is also an object to provide a computer program product with instructions able to be executed by a processor for performing the method steps in accordance with the disclosed embodiments of the invention.

It is a further object of the invention to provide a device for error detection during execution of a real-time operating system, where the device includes a first processor with at least two processor cores, and the device is configured for parallel execution of identical instances of the real-time operating system on the processor cores in a shared virtualization environment. The device additionally includes a hypervisor that is configured for monitoring the parallel execution of the instances. The device is additionally configured such that, upon execution of a hardware access initiated by the instances, the hypervisor compares the data transmitted during the hardware access for each instance, and in the event of a deviation of the transmitted data or in the event of the hardware access initiated unilaterally by one of the instances, the hypervisor detects an error.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention are explained in greater detail below with reference to the drawings, in which:

FIG. 1 is an illustration of a schematic block diagram of a device for error detection during execution of a real-time operating system in accordance with the invention;

FIG. 2 is an illustration of a schematic block diagram of different memory layout options;

FIG. 3 is an illustration of a schematic block diagram of a device for error detection in the execution of a real-time operating system using a hypercall interface in accordance with the invention;

FIG. 4 is an exemplary schematic block diagram of how the associated memory areas of the shared memory can be differentiated for instances for different data types in accordance with the invention;

DETAILED DESCRIPTION OF THE PREFERRED EMBODIMENTS

Figure 5:
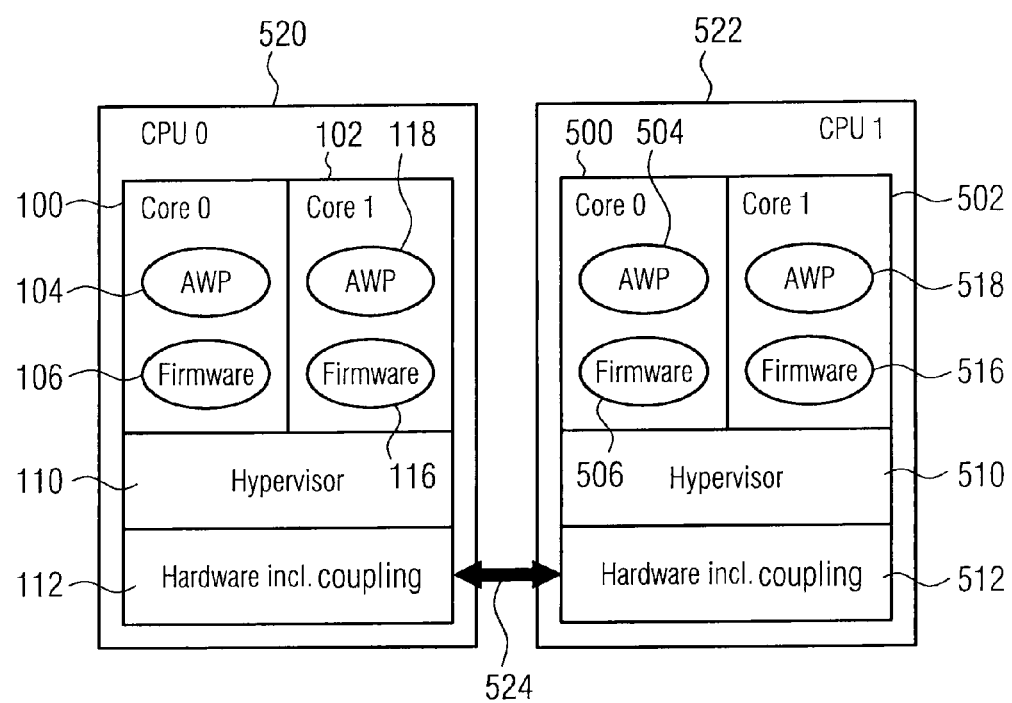
FIG. 5 is an illustration of a schematic block diagram of an H system.

Elements similar to one another are identified by the same reference characters below.

FIG. 1 shows a block diagram of a device for error detection during execution of a real-time operating system. Here, as described above, a processor is shown that includes two cores (core 0 and core 1), identified by the reference numbers 100 and 102. An instance of a real-time operating system is executed on each of the cores, where in FIG. 1 the real-time operating system is referred to as "Firmware". The firmware 106 of the core 100 is logically identical to the firmware 116 of the core 102 and is executed in parallel in a shared virtualization environment. It should be noted that the firmware instances are only "logically" identical but can be completely physically separate from one another by virtue of the above described measures for diversification. Here, the firmware instances are identical except for those measures used for the diversification (e.g., different virtual address space is used). In such case, a hypervisor 110 monitors the parallel execution of the firmware instances 106 and 116. In the event of a hardware access with hardware virtualization, there is an access of the respective firmware 106 and 116 to the shared hardware 112, where the hypervisor 110 is able to trap these hardware accesses. This trapping of the hardware accesses is labeled in FIG. 1 with the reference numbers 108 and 114 using the term "synchronization point".

It should also be noted here that a synchronization point, for earlier error detection, can also be set in the firmware independently of hardware accesses.

Upon execution of an access initiated by the firmware 106 or 116 to the hardware 112, the data transmitted for hardware access is compared to each other by the hypervisor 110 (see reference number 128).

The two firmware instances 106 and 116 are logically identical and operate in parallel to one another. As a result, a unilateral access initiated by one of the firmware instances 106 or 116 to the hardware 112 is the decision that there must be an error in the execution of the firmware instances 106 or 116. Likewise, the hypervisor 110 is in a position to detect an error as such if, in the event of a parallel hardware access of the firmware instances 106 and 116, the data transmitted in the access differs from each other.

The firmware instances 106 and 116 each form an identical real-time operating system for executing corresponding application programs 104 and 118, which for the purposes of error detection must likewise be identical.

The hardware access above described comprises an access to the memory 120, wherein during the execution of a memory access initiated by the firmware instances 106 and 116, the firmware instances access the shared memory 120. In this case, one part of the memory 120 is assigned with area 122 to the firmware 106, and another part of the memory is assigned with area 124 to the firmware 116. A further memory area 126 is reserved for the hypervisor 110.

FIG. 2 shows different memory layout options. A memory layout is shown in FIG. 2a in which the instances of the firmware instances 106 and 116 each have the same virtual address space available to them. This virtual address space is, however, assigned different physical address spaces in the memory 120. This thus relates to the case in which absolutely identical versions of the firmware instances 106 and 116 are run or executed.

In contrast, FIG. 2b shows the possibility of allocating different virtual address spaces, where the firmware instances 106 and 116 are relocated differently. As already described above in detail, this makes it possible to detect data corruption from reading and writing by incorrect pointers.

FIG. 3 shows a block diagram of a device for error detection during the execution of a real-time operating system. Unlike FIG. 1, in FIG. 3 a hardware access is undertaken with paravirtualization which, as described above, means that the corresponding hardware driver is relocated into the hypervisor 110. The "hypercall interface" labeled with the reference numerals 300 and 302 represents the software interface that makes it possible to simplify the structure of the hypervisor 110 and executes the firmware instances 106 and 116 with enhanced performance.

FIG. 4 shows a possibility of how, for different data types, the associated memory areas of the shared memory can be differentiated for different instances.

As already explained above, one error source in the use of pointers is addressing beyond the permitted area. In such cases, data in the neighborhood of the actual user data is either misinterpreted or corrupted. If, for example, the firmware being used is incorrectly programmed, so that instead of an exact addressing of memory area Var2 an actual addressing extends beyond the permitted area of Var2, then writing and reading of data from the area of Var3 (see, e.g., FIG. 4a) in relation to firmware instance 106 occurs.

If, however, for the different data types Var1, Var2, Var3 and Var4 for the firmware instances 106 and 116, a re-sorting of the different data areas is undertaken, then such an error source can be uncovered as a result of different resulting transmitted data for a corresponding memory access.

If for example, as shown in FIG. 4a, with the use of pointers an addressing beyond Var2 is undertaken, this results in relation to the firmware 106 in data from the area Var3, whereas the firmware 116 instead delivers data from the area Var1. Since this delivered data would not normally be identical, the hypervisor is thus able to detect the data corruption as a result of reading and writing beyond area boundaries and accordingly to identify an error in the execution of the firmware instances 106 and 116.

FIG. 5 shows a block diagram of an H system. With reference to FIG. 5, the H system consists of two control modules, i.e., the CPUs 520 and 522 that are linked to each other by corresponding communication modules. Here, the communication modules can be part of the hardware 112 of the CPU 520 and the hardware 512 of the CPU 522.

The CPU 520 in its turn features the device for error detection in accordance with FIG. 1, i.e., the combination of the cores 100 and 102 with the respective firmware instances 106 and 116 and the hypervisor 110.

In a similar manner, the CPU 522 features cores 500 and 502 upon which likewise logically-identical firmware instances 506 and 516 execute. Here, the two firmware instances 506 and 516 are logically identical to the firmware instances 106 and 116. Also provided in relation to the CPU 522 is a hypervisor 510 that monitors the parallel execution of the instances of the firmware instances 506 and 516.

By this, at least one further identical instance of the firmwares 106 and 116 is executed on the processor 522. In the event of an error being detected, i.e., the presence of an error in relation to the execution of the firmware instances 106 or 116, the hardware 112 notifies this error to the CPU 522, which subsequently, independently of the state of the CPU 520, continues its tasks alone. Here, communication between hardware 112 and 512 is undertaken over the communication link 524 outlined in FIG. 5.

As an alternative, it is also possible that, in the event of an error being detected, the CPU 520 completely ceases operation or interrupts the communication link 524 with the hardware 520. Here, the CPU 522 can be configured so that, upon interruption of the communication link 524, the operation of the CPU 522 alone is continued.

Various detection scenarios in the H system of FIG. 5 are discussed below. In the event of data corruption being established in one of the H-CPUs in accordance with the method described above, the H-CPU causing the error is uniquely identified. It must then be removed from the H system.

This case occurs for example with hardware errors caused by flipped bits in the memory of an H-CPU and software errors in firmware parts that only run on one H-CPU of the H system. It can occur for software errors in synchronously running firmware parts that have different effects through the described firmware modifications.

A further possibility is establishing data corruption in both H-CPUs, because the above-described measures for detecting data corruption can lead to parallel-executed incorrect code being detected on both H-CPUs of an H system. This case leads to the failure of the H system and is to be absolutely avoided, which is to be ensured, as already stated by use of quality-assurance measures. Here, an advantage of the current error is that the error that is the cause can be detected at an early stage, which specifically facilitates the analysis of errors in the test phase.

In order to minimize the probability of the H system behaving incorrectly, the variations described above can be implemented differently on the firmware for each of the four processor cores. That is, in relation to the firmware instances 106 and 116, the firmware of the two cores can be stored at different virtual addresses, whereas in relation to the firmware instances 506 and 516, the firmware of the cores can once again be stored at different virtual addresses.

The diversity of the firmware variants, on the one hand, increases the probability of an error being uncovered, while it decreases the probability of a bilateral error in the H system, on the other hand.

A further scenario is establishing data corruption in the H system, with this case describing the incorrect behavior of an H system that is not detected by the individual H-CPUs. It can be caused, for example, by incorrectly programmed algorithms in the firmware. Here, the memory protection offers no advantage over the previous H system. This type of error is also to be avoided by using quality-assurance measures.

It should also be noted that the use of the described measures in fault-tolerant systems (F systems) could also be possible.

Figure 6:
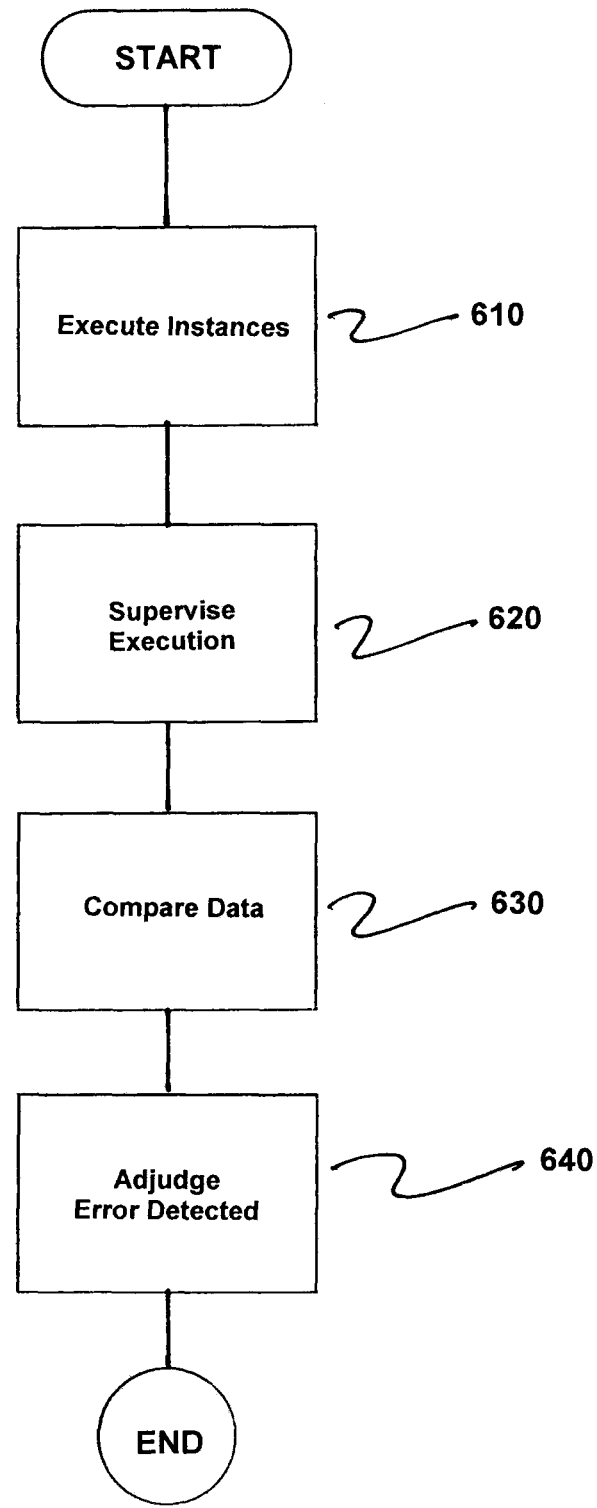
FIG. 6 is a flow chart of the method in accordance with an embodiment of the invention.

FIG. 6 is a flow chart of a method for error detection during execution of a real-time operating system. The method comprises executing logically-identical instances of the real-time operating system in parallel on at least two processor cores of a first processor in a shared virtualization environment, as indicated in step 610.

The hypervisor supervises the parallel execution of the logically-identical instances, as indicated in step 620. During execution of a hardware access initiated by the logically-identical instances data transmitted during the hardware access for each of the logically-identical instances is compared by the hypervisor, as indicated in step 630.

The hypervisor adjudges that an error has occurred in an event of one of a discrepancy between the data transmitted and a unilateral hardware access initiated by one of the logically-identical instance, as indicated in step 640.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for error detection during execution of a real-time operating system, comprising:
   executing logically-identical instances of the real-time operating system in parallel on at least two processor cores of a first processor in a shared virtualization environment;
   supervising, by a hypervisor, the parallel execution of the logically-identical instances;
   during execution of a hardware access initiated by the logically-identical instances, comparing, by the hypervisor, data transmitted during the hardware access for each of the logically-identical instances; and
   adjudging, by the hypervisor, that an error has occurred in an event of one of a discrepancy between the data transmitted and a unilateral hardware access initiated by one of the logically-identical instances.

2. The method as claimed in claim 1, wherein the hardware access comprises a memory access; and wherein during execution of the memory access initiated by the logically-identical instances, the logically-identical instances access a shared memory.

3. The method as claimed in claim 2, wherein the memory is accessed utilizing identical virtual address spaces for the logically-identical instances; and wherein the virtual address spaces are assigned different physical address spaces for each of the logically-identical instances.

4. The method as claimed in claim 2, wherein the memory is accessed utilizing different virtual address spaces for the logically-identical instances.

5. The method as claimed in claim 4, wherein physical address spaces are assigned to respective virtual address spaces; and wherein the respective virtual address spaces are identical to respective physical address spaces.

6. The method as claimed in claim 2, wherein for different data types associated memory areas of the shared memory differ for the logically-identical instances.

7. The method as claimed in claim 1, wherein the hardware access initiated by an instance of the logically-identical instances comprises a direct hardware access or a hardware access via a hypercall using paravirtualization.

8. The method as claimed in claim 1, wherein at least one further identical instance of the real-time operating system is also executed on a second processor; and wherein, in an event of an error being detected, a presence of the error is notified to the second processor.

9. The method as claimed in claim 8, wherein the error is notified by sending a signal to the second processor or by deactivating a communication link to the second processor.

10. A non-transitory computer program product encoded with a computer program executing on a processor which, when used on a computer apparatus, causes error detection during execution of a real-time operating system, the computer program comprising:
    program code for executing logically-identical instances of the real-time operating system in parallel on at least two processor cores of a first processor in a shared virtualization environment;
    program code for supervising, by a hypervisor, the parallel execution of the logically-identical instances;
    program code for during execution of a hardware access initiated by the logically-identical instances, comparing, by the hypervisor, data transmitted during the hardware access for each of the logically-identical instances; and
    program code for adjudging, by the hypervisor, that an error has occurred in an event of one of a discrepancy between the data transmitted and a unilateral hardware access initiated by one of the logically-identical instances.

11. A device for error detection during execution of a real-time operating system, comprising:
    a first processor having a plurality of processor cores; and
    a hypervisor;
    wherein the device is configured to:
        execute logically-identical instances of the real-time operating system in parallel on the at least two processor cores in a shared virtualization environment; and
    wherein the hypervisor is configured to:
        supervise the parallel execution of the logically-identical instances;
        compare, by the hypervisor, during a hardware access initiated by the logically identical instances data transmitted during the hardware access for each of the logically-identical instances; and
        detect an error in an event of a discrepancy between the data transmitted or in an event of a unilateral hardware access initiated by an instance of the logically-identical instances.

* * * * *